Dec. 23, 1969  S. DEINES ET AL  3,484,885

HYDRAULIC MOTOR DRIVEN TOOTHBRUSH

Filed Jan. 15, 1968  2 Sheets-Sheet 1

INVENTORS
Siegmund Deines
Homer A. Jeffers, Jr.
Wayne W. Monroe
John W. Mattingly

BY

ATTORNEYS

INVENTORS
Siegmund Deines
Homer A. Jeffers, Jr.
Wayne W. Monroe
John W. Mattingly

ATTORNEYS

United States Patent Office 3,484,885
Patented Dec. 23, 1969

3,484,885
HYDRAULIC MOTOR DRIVEN TOOTHBRUSH
Siegmund Deines, Homer A. Jeffers, Jr., Wayne W. Monroe, and John W. Mattingly, Fort Collins, Colo., assignors to Aqua Tec Corporation, Fort Collins, Colo., a corporation of California
Filed Jan. 15, 1968, Ser. No. 697,836
Int. Cl. A46b *13/06*
U.S. Cl. 15—22           9 Claims

ABSTRACT OF THE DISCLOSURE

A hydraulic motor driven toothbrush comprises a handle having an expansible chamber hydraulic motor therein for producing reciprocating movement of the brush. The motor is energized by a stream of liquid pressure pulses supplied from a source such as an oral hygiene appliance of the intermittent pulse jet type and a manually controlled bypass valve is provided to facilitate starting of the motor. The frequency of the pulses determines the rate of reciprocation or of oscillation of the brush.

---

This invention relates to motor driven toothbrushes and particularly to an improved motor driven toothbrush utilizing a hydraulic drive.

Electric motor driven toothbrushes have been provided heretofore which employ various types of driving connections. These devices have proved satisfactory for a wide range of applications. As an adjunct to the toothbrush, an oral hygiene appliance is available which provides a stream of water of small cross section which is delivered in a jet of intermittent equal pulses and effects a cleaning of areas of the teeth and gums not normally reached by the toothbrush. One form of this appliance is disclosed in U.S. Letters Patent No. 3,227,158, issued to John W. Mattingly on Jan. 4, 1966, and assigned to the same assignee as the present invention. It is desirable to provide a motor driven toothbrush which can employ the same electric motor as that which drives the intermittent water pulse appliance.

Accordingly, it is an object of this invention to provide an improved motor driven toothbrush which can be driven by the output stream of a pulsed jet oral hygiene appliance and requires a minimum flow of water for effective operation.

It is another object of this invention to provide an improved motor driven toothbrush which is light in weight, relatively small in size, and easily manipulated.

It is another object of this invention to provide a hydraulic motor driven toothbrush including an improved arrangement for starting the operation of the motor.

Briefly, in carrying out the invention in one embodiment thereof, a motor driven toothbrush is provided which is hydraulically actuated and may be operated from the output of an oral hygiene appliance of the type which delivers a stream of water in a continuous series of spaced equal pressure pulses. The hydraulic motor comprises a piston directly connected to the brush and which is spring biased to its minimum volume position. A supply of intermittent pressure pulses is connected to the cylinder and on each pressure pulse the piston is forced forward and then returned during the rest between pulses. A bypass valve is provided to purge the motor on starting and also to supply water to the zone of the toothbrush where it is available for rinsing.

In another embodiment of the invention, the piston comprises a free floating member which contacts the driving rod for the toothbrush. This arrangement of the piston greatly facilitates the assembly of the device and assures operation over extended periods of time without difficulty due to misalinement.

The features of novelty which characterize this invention are pointed out with particularity in the claims annexed to and forming a part of this specification. The invention itself, however, both as to its organization and method of operation, together with further objects and advantages thereof will be best understood by reference to the following description taken in connection with the accompanying drawings in which:

Figure 1:
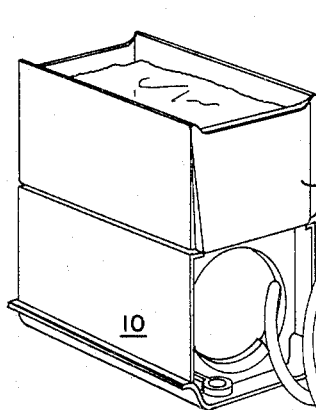
FIG. 1 is a perspective view of an oral hygiene appliance of the intermittent jet type connected to drive a toothbrush embodying the invention.

Referring now to the drawings in FIG. 1 there is illustrated an oral hygiene appliance 10 having a reservoir 11 in position to supply water thereto. The appliance is actuated by an electric motor (not shown) which drives a pump to produce an intermittent stream comprising pressure pulses separated by rest periods. This stream is supplied through a conduit 12 to a fixture 13 which has been shown connected to supply the stream to a toothbrush assembly 14 embodying the present invention. The assembly 14 includes a brush having bristles 15 and connected by a shaft 16 to be reciprocated by the operation of the hydraulic motor in the body of the assembly 14.

Figure 2:
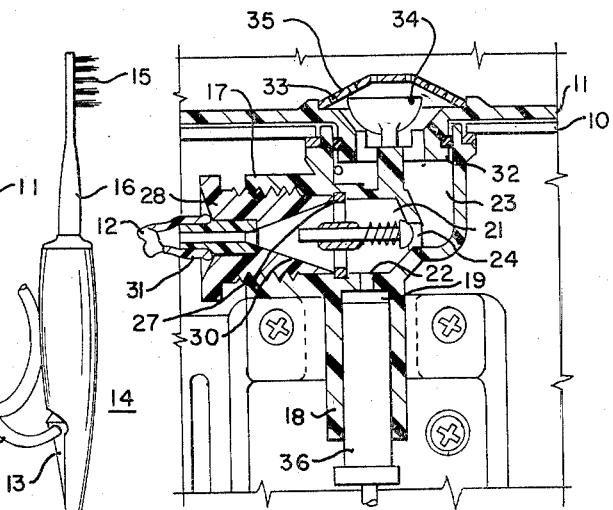
FIG. 2 is a sectional view of the pump employed in the appliance of FIG. 1.

The pump employed in the appliance 10 is illustrated in FIG. 2 which is a sectional view showing the reservoir 11 in position on the top of the unit 10 directly above a pump body indicated at 17. The body 17 is formed to provide a block 18 within which there is formed an upright cylinder 19; immediately above the cylinder there is a pump chamber 21 connected to the cylinder 19 by a port 22. Water for the pump is applied from an inlet chamber 23 of upright cylindrical configuration and is admitted to the chamber 21 through an inlet port 24. The inlet port is controlled by a spring pressed valve 25 which is mounted in a spider comprising a hub 26 and a ring 27 mounted centrally of the chamber 21; the ring is locked in position by a threaded fitting 28 having a cone shaped passage 30 formed therein which terminates in the outlet passage 31 of the pump. In order to supply water to the inlet chamber 23 the bottom of the reservoir 11 is formed with a downwardly extending boss 32 which is sealed to the walls of the chamber 23 by an O-ring 33. The reservoir is provided with an outet valve 34 which is biased by gravity to its closed position; when the reservoir is placed in position on the unit the valve is lifted by a post 35 as shown so that the passage from the reservoir to the chamber 23 is open.

During the operation of the pump the piston, indicated at 36, is reciprocated in the cylinder 19 and draws water in from the reservoir and chamber 23 through the port 24 to the chamber 21 and thence into the cylinder through the port 22. When the direction of the piston is reversed water is discharged from the cylinder 19 into the chamber 21 and thence out through the outlet 31. Because of the inertial characteristics of the flow of water from the chamber 21 through the conduit 12, there being no discharge valve, there is a tendency for water to continue to flow after the piston has reached its uppermost position and started to return; thus more water is discharged from the pump than the amount displaced by the piston. This type of flow has proved advantageous for use in appliances such as the appliance 10. The stream produced by this pump may be utilized to drive the toothbrush 14 in a manner which will be apparent from the following description.

Figure 3:
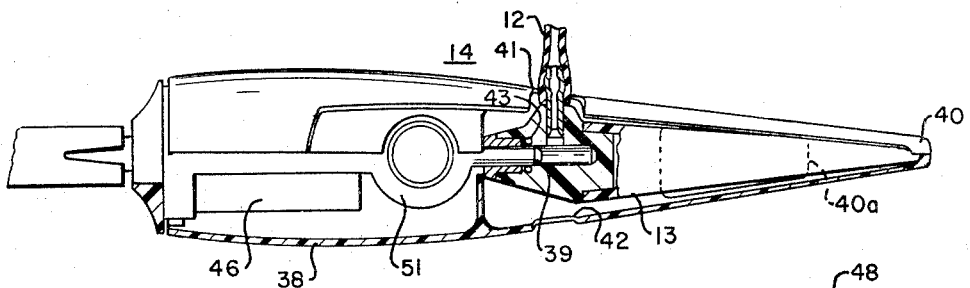
FIG. 3 is a plan view partly in section of the mechanism of the toothbrush of FIG. 1.
Figure 4:
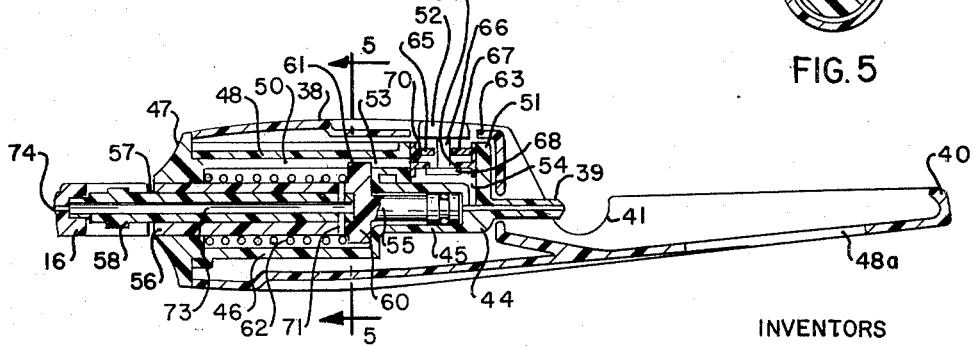
FIG. 4 is a sectional elevation view of the device of FIG. 3.

The body of the toothbrush as shown in FIGS. 3 and 4 is generally round in cross section and tapers generally toward the right. The body comprises a shell 38 constructed of suitable hard plastic material. The inlet for the motor is shown as a nipple 39 which may be engaged by the fitting 13 of the appliance 10 as indicated in FIG. 3. The fitting 13 when it is engaged in the manner shown in FIG. 3 may be rotated from its position at the top where the fitting engages the conduit 12 and lies within an opening or recess 41 to a substantially opposite position where the outlet lies within a corresponding opening 42. When the fitting is in this position leakage between the fitting and the nipple 39 is prevented by an O-ring indicated at 43. When the fitting is to be placed in the position shown in FIG. 3 it is first placed over the nipple 39 and then moved downwardly into the position shown wherein the far end of the fitting is engaged in a pocket formed by a curved wall portion 40 of the shell 38. Removal of the fitting from its position in the shell 38 is facilitated by providing an opening 40a in the bottom of the shell along the handle portion of the fitting so that the fitting may be gripped between the thumb and finger and released from the pocket 40. The nipple 39 is provided with a central passage which leads directly to a cylinder 44 formed in a block 45 of the pump assembly. The assembly further includes a cylindrical portion 46 of greater diameter than the block 45 and which is securely attached to an end piece 47 which also carries the forward end of the shell 38. Along the upper side of the cylinder 46 there is formed an extension 48 within which there is a longitudinal groove 50; this upper extension 48 of the cylinder 46 extends backward beyond the main portion of the cylinder and above the cylinder 45 wherein it merges with an upright cylindrical portion 51 within which there is arranged a valve assembly actuated by a push buttom 52. A passage indicated at 53 which is an extension of the groove 50 is in communication with the interior of the cylindrical portion 51 and this portion is also in communication with the inlet through a duct 54.

Figure 5:
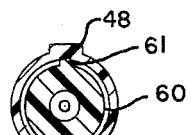
FIG. 5 is a sectional view taken along the line 5—5 of FIG. 4.

The mechanism is actuated by reciprocation of a piston 55 in the cylinder 44; this reciprocation being effected by the admission of pressure pulses to the cylinder to cause forward motion of the piston and subsequent return under a biasing spring in a manner to be described. The parts of the mechanism as is indicated are of plastic as this material has been found well suited for this purpose. The drive assembly includes a cylindrical tube 56 within which is mounted a smaller tube 57 which extends beyond the tube 56 and terminates in a portion 58 for attachment of the brush shaft. The opposite end of the cylinder 56 terminates in a disc 60 having a diameter slightly less than the internal diameter of the cylinder 46 as indicated in FIG. 5. This disc is provided with an extension 61 which rides in the groove 50 and prevents rotation of the cylinder assembly. In order to bias the piston 55 to its low volume position at the right as shown in FIG. 4 a compression spring 62 is loosely positioned about the cylinder 56 and abuts the end member 47 and the disc 60 to urge the piston toward the right. Thus as soon as the pressure pulse ceases the piston begins to move toward the right.

Figure 6:
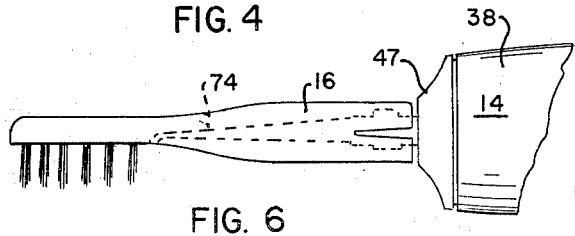
FIG. 6 is a side elevation view of a portion of the device of FIG. 3 showing a detachable toothbrush in position thereon.

The operation of the system with the pump illustrated in FIG. 2 is such that when the piston 55 moves to the right water is returned to the pump and it is not necessary to supply additional water from the chamber 23. The operation thus can continue without removing substantial quantities of water from the reservoir 11. It is desirable, however, particularly for starting of the hydraulic motor of the toothbrush that any air or gas in the system be purged from the system in order to secure uniform and steady operation. It is for the purpose of purging the system and also for the additional purpose of occasionally supplying water to the zone of the bristles 15 of the brush that the push button valve 52 has been provided. The valve assembly which is fitted within the cylinder extension 51 comprises a cylindrical side wall 63 having mounted therein a lower disc 64 and an upper disc 65, the lower disc having an opening which is a valve port and the upper disc an opening affording sliding of the valve steam indicated at 66. This upper disc may be provided with an O-ring indicated at 67 to minimize leakage of water from the system during the pressure pulses. The opening in the lower disc may be closed by a disc 68 secured to the bottom of the stem 66. During the pressure pulses disc 68 is forced against the stationary disc 64 and prevents the passage of water through the valve. Should it be desired to supply water through the valve a button 52 is pressed whereupon during the pressure pulse water flows through the hole in the disc 64 and enters the passage 53 through a port 70 in the cylindrical wall 63. This water reaches the interior of the cylinder 46 through the spaces about the disc 60 and from the cylinder flows out through passages 71 on either side of the cylinders 56 and 57 and reaches a central passage in the member 57 as indicated at 73 and this passage is in direct communication with the toothbrush through a passage 74 provided in the shaft of the toothbrush as indicated in dotted lines in FIG. 6.

For operation of the toothbrush illustrated in FIGS. 1 through 6 the motor of the appliance 10 is first started and is allowed to run. The valve button is pressed downward briefly to allow a flow of fluid through the toothbrush for a short period of time. Air is thereby purged from the system assuring maximum response of the hydraulic motor to the pulse flow conditions. Thereafter the brush may be operated continuously and when it is desired to supply water to the zone of the bristles for rinsing or other purposes this is done by again pressing the valve button 52.

Figure 7:
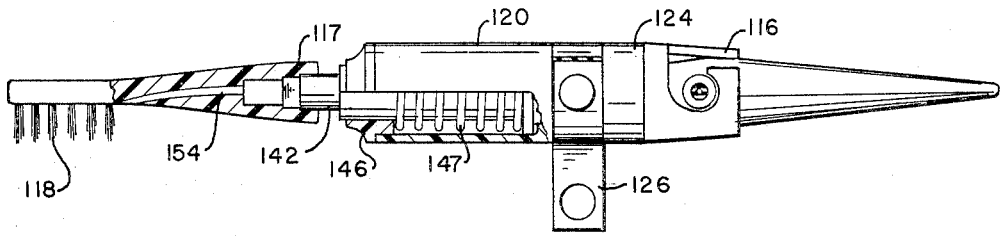
FIG. 7 is a side elevation view of a further embodiment of the invention.
Figure 8:
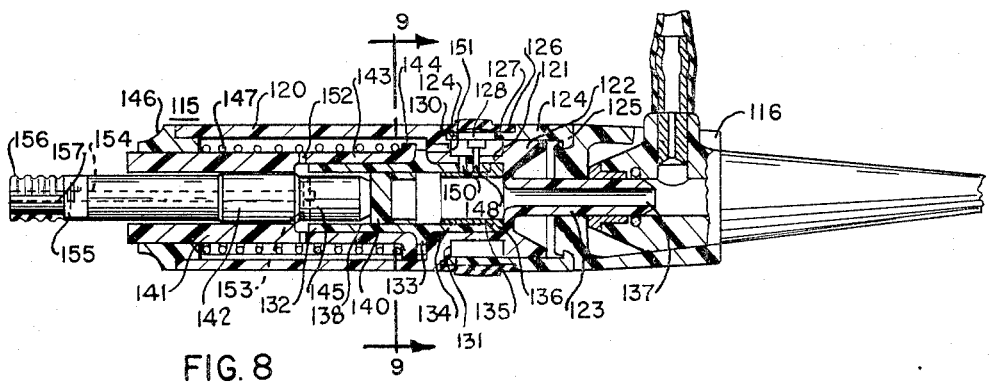
FIG. 8 is a sectional view of the body of the embodiment of FIG. 7 showing the driving mechanism thereof.

The motor driven toothbrush illustrated in FIG. 7 comprises a main body portion 115 having a rear portion 116 which is rotatable with respect to the body 115 and is constructed to constitute a fitting for receiving the outlet fixture 12 of the appliance 10 of FIG. 1. A toothbrush comprising a stem 117 and bristles 118 is detachably connected to the forward end of the body 115 in a position to be reciprocated by the hydraulic motor within the body. The details of construction of this embodiment of the invention are shown in FIGS. 8 through 11, inclusive. As shown in these figures the main body portion comprises a generally cylindrical housing 120 having a portion 121 of reduced cross section and terminating in an annular collar 122 of generally triangular cross section. The collar portion 122 carries an integrally formed nipple 123 which is the inlet connection for the motor within the body portion. An annular wall member 124 is fitted on the outer surface of the collar 122 and extends beyond the collar for a short distance where it terminates in an inwardly extending flange 125. It will now be seen that an annular space is provided about the reduced wall portion 121 between the main body portion 120 and the annular member 124. The annular passage about the wall portion 121 is closed by an extension of the member 124 which is of reduced diameter and covers the annular passage except for a circular opening 127 which accommodates a valve actuating button 128. A resilient band 126 of rubber or similar plastic material is mounted about the reduced portion of the member 124 covering the opening 127 and presents an outer surface flush with the outer surface of the body portion of the unit. The forward edge of the band 126 has an inwardly turned flange 130 which is clamped between the member 124 and the main body portion 120, the body portion being provided with a step 131 to receive the reduced portion of the member 124 which extends radially beyond the step 131 and provides a pocket in which the flange 130 is held.

A cylindrical cylinder block 132 is mounted concentrically within the body portion 120 and has an outwardly extending flange 133 which bears against the inner wall of the body 120 adjacent the reduced portion 121. The cylinder block 132 further is provided with a cylindrical extension 134 which lies within its cylindrical chamber formed within the reduced body portion 121 and which clamps a resilient sleeve 135 against the end wall of the body portion adjacent the annular collar 122. For purposes of clamping, the resilient sleeve 135 is provided with an outwardly extending flange 136 which is clamped between the cylindrical portion 134 of the block 132 and the inner end wall of the body portion about the inlet from the nipple 123. This inlet is indicated as a passage 137. The cylindrical extension 134 of the block 132 is secured in the cylindrical chamber within the wall portion 121 by a press fit. Within a cylinder 138 formed within the block 132 a piston 140 is mounted for free sliding movement. In order to transmit motion from the piston 140 to the brush a piston drive assembly is provider which comprises an outer cylindrical portion 141 and an inner rod portion 142. The outer portion 141 is of cylindrical configuration and includes a cylinder portion 143 which fits about the outer cylindrical wall of the block 132. The portion 143 terminates in an outwardly extending flange 144 which is of a configuration indicated in the sectional view FIG. 9. The inner cylindrical portion 142 is provided with an extension 145 of reduced diameter which lies within and is spaced from the walls of the cylinder 138. This extension is positioned to engage the piston 140 in face contact. The body member 120 is closed at its left end by a collar 146 which acts as a bearing for the drive assembly and a compression spring 147 is mounted about the drive assembly between the collar 146 and the flange 144 of the cylinder 141. It will thus be seen that the drive assembly is biased toward the right in a position where it will be engaged by the piston 140.

The valve button 128 carried on a stem 148 slidably mounted in an opening in the wall 121 and the cylindrical extension of the block 132. Adjacent the stem 148 there is provided a passage through the block extension in wall 121, as indicated at 150, which is closed by the resilient sleeve 135; the sleeve may be moved away from the passage 150 by pressing down on the button 128 to move a portion of the sleeve inwardly. Water may then flow from the inlet through the passage 150 into the annular passage about the wall 121 and thence through a port 151 into the chamber between the wall 120 and the cylindrical member 141. Liquid admitted to this chamber is discharged through ports 152 in the wall of the cylindrical member 141 and thence flows into a passage 153 extending across the rod member 142 and communicating with a passage 154 extending centrally and longitudinally through the member 142 from the passage 153 to the end of the member. Thus by pressing the button 128 to open the port 150 liquid may be bled from the intake chamber through the body portion and out to the toothbrush zone. This bleeding is particularly useful for priming the pump on starting and removes any air trapped in the system.

Figure 9:
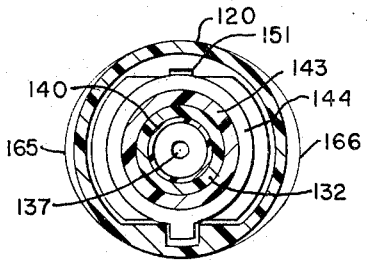
FIG. 9 is a sectional elevation view taken along the lines 9—9 of FIG. 8.
Figure 10:
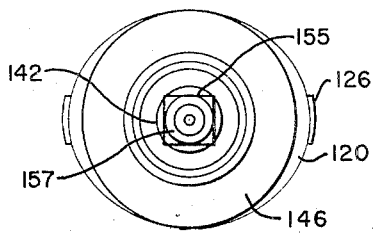
FIG. 10 is a front elevation view of the mechanism of FIG. 8.
Figure 11:
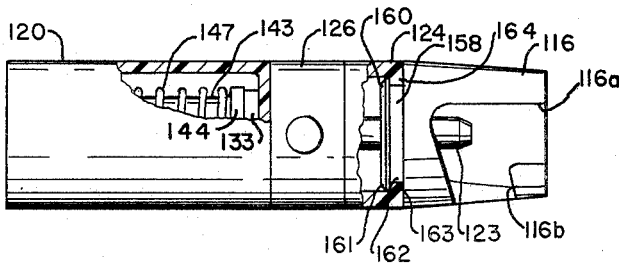
FIG. 11 is a top view of the embodiment of FIG. 8 partly in section and showing the attachment fitting of the device of FIG. 8.

Because the piston 140 is free and not directly connected to the reciprocating assembly comprising the cylinders 141 and 142 it is not necessary to aline the piston precisely with the reciprocating member 145. It will be seen that the reciprocating motion transmitting assembly is guided by the engagement of the cylindrical extension 143 about the block 132 and by the bearing surface provided by the annular collar 146 at the closed end of the body. The shaft 117 of the brush element is secured to the reciprocating assembly by an extension of the cylinder 142 indicated at 155 and which is square in cross section as shown in FIG. 9; the passage through the brush is sealed against leakage by a corrugated sealing member 156 which fits over a reduced portion of the rod 142 indicated at 157. The corrugation of the sealing member is in sealing engagement with a circular portion of the toothbrush shaft socket. The toothbrush shaft socket also includes a square portion which fits about the element 155 and thereby prevents rotation of the brush on the shaft 142.

The rotatable rear fitting 116 is constructed to receive a fixture constructed as the fixture 13 of FIG. 1; for this purpose the collar 122 and nipple 123 are arranged to receive the end of the discharge fixture and to be sealed thereto by the O-ring within the fixture. In order to attach the fitting 116 to the body 115 the fitting 116 is provided with a short cylindrical extension 158 which is provided with an outwardly extending flange 160; this flange is beveled so that on assembly the bevel as indicated at 161 can be pressed into position within a circular opening 162 formed by a flange 163 of the wall member 124, the outer side of this latter flange being beveled as indicated at 164. When the flanges 160 and 164 are brought together the flange 160 may be forced into position through the opening 162 and will thereafter remain in place on the inner side of the flange 164. This assembly is possible because the plastic material of which the fitting 116 is made will compress sufficiently to allow this movement through the opening 162 and then spring back. The space between the flange 160 and the body portion of the fitting 116 is slightly greater than the width of the flange 163 and the fitting 116 may easily be rotated with respect to the main body portion of the unit. Thus, the toothbrush may be rotated to any desired position about the longitudinal axis of the unit and manipulation of the toothbrush is greatly facilitated. As a further aid to the rotation of the main body portion with respect to the fixture 116 the body portion is made slightly out of round as indicated in FIG. 9 where the two side portions indicated at 165 and 166 are shown as bulging outwardly from the main cylindrical body portion. This bulge provides a feeling of a positioned grip for the user. The fitting 116 is provided with a longitudinal slot 116a and a lateral slot 116b, which provides a bayonet-type joint for attaching the outlet fixture 13 of the appliance 10.

The operation of the device of FIG. 7 is illustrated as essentially the same as that of the device of FIGS. 2 and 3, piston 140 being forced forward under a pressure pulse and moving the drive assembly 141 against the pressure of the spring 147 and upon termination of the pressure pulse and the occurrence of a rest period returning the piston by the pressure of the spring to its low volume position. Fluids may be discharged from the intake of the motor by operation of the valve 128 both at the beginning of operation of the toothbrush and at desired intervals thereafter. This makes it possible to brush the teeth using a selected dentifrice and thereafter to admit water to the zone of the brush to facilitate the rinsing of the mouth.

It will thus be apparent that this invention provides a system effectively employing a pulsating stream of water to actuate a hydraulic motor and drive a toothbrush with a back and forth movement which may be employed for effective cleaning of the teeth.

We claim:

1. A motor driven toothbrush for use with an oral hygiene appliance of the type having an output fixture for delivering a stream of intermittent liquid pressure pulses comprising a handle and a toothbrush mounted thereon for back and forth movement, a hydraulic motor of the expansible chamber type movable between minimum and maximum volume positions mounted in said handle and connected to drive said toothbrush with back and forth movement, means for biasing said motor to its minimum capacity position, means for connecting the stream discharge fixture of an intermittent liquid pressure appliance to said handle with the output thereof in closed communication with said expansible chamber motor, and a selectively operable release valve for discharging fluid from the intake side of said motor for purging the intake of gas and priming the motor.

2. A motor driven toothbrush as set forth in claim 1 including means for delivering the fluid from said release valve to the bristle zone of said toothbrush.

3. A motor driven toothbrush for use with an oral hygiene appliance of the type having an output fixture for delivering a stream of intermittent liquid pressure pulses comprising a handle and a toothbrush mounted thereon for back and forth movement, a hydraulic motor of the expansible chamber type movable between minimum and maximum volume positions mounted in said handle and connected to drive said toothbrush with back and forth movement, means for biasing said motor to its minimum capacity position, means for connecting the stream discharge fixture of an intermittent liquid pressure appliance to said handle with the output thereof in closed communication with said expansible chamber motor, said means for connecting the discharge fixture to said handle comprising a hollow nipple on said handle and in communication with the chamber of said motor, and an attaching member mounted on said handle for rotation throughout 360° with respect thereto and extending about said nipple for holding the discharge fixture in communication with said nipple and for affording relative rotation of said handle and the fixture.

4. A motor driven toothbrush for actuation by a stream of spaced pressure pulses of liquid comprising an elongated housing of generally cylindrical configuration, a cylinder block having a cylinder therein and mounted with the axis of the cylinder extending in the direction of the longitudinal axis of said housing, a motion transmitting member slidably mounted in said housing for movement in alinement with said cylinder and having an end portion extending outside said housing for holding a brush, a free piston mounted for reciprocation in said cylinder, said motion transmitting member having a portion thereof extending into one end of said cylinder and spaced from the wall thereof for engagement with said piston, spring means for biasing said member toward the other end of said cylinder, and inlet means near said other end of said cylinder for admitting liquid under pressure to move said piston in engagement with said member and toward said one end against said biasing means whereby the admission of intermittent pressure pulses of liquid to said cylinder produces reciprocation of said piston and drives said motion transmitting member.

5. A motor driven toothbrush as set forth in claim 4 wherein said block has a cylindrical outer wall concentric wtih said cylinder and said motion transmitting member has a hollow cylindrical end portion slidably engaging said outer wall of said block for guiding said member during engagement of said extended portion and said piston.

6. A motor driven toothbrush as set forth in claim 4 wherein said motion transmitting member has a longitudinal passage therein and extending through the outer end thereof, and including means providing communication between said passage and said inlet means, and a selectively actuated valve in said communication means for controlling the passage of liquid therethrough.

7. A motor driven toothbush as set forth in claim 6 wherein said communicating means includes an annular space between said member and said housing and a passage connecting said space and said inlet means and terminating in a port adjacent said inlet means, and said valve comprises a flexible member covering said port, and a selectively actuated finger for moving said flexible member from said port to open said port.

8. A motor driven toothbrush as set forth in claim 7 wherein said inlet means includes a cylindrical passage and said flexible member is a cylindrical sleeve engaging the walls of said cylindrical passage and having one end securely attached to said housing.

9. A motor driven toothbrush as set forth in claim 8 wherein said cylindrical passage comprises an extension of said cylinder and said sleeve includes an outwardly extending flange, said flange being securely clamped between the end of said cylinder block and the wall of said housing adjacent said inlet.

References Cited

UNITED STATES PATENTS

| 2,373,972 | 4/1945 | Moreno | 173—116 X |
| 2,384,435 | 9/1945 | Bodine | 60—54.5 X |
| 3,093,900 | 6/1963 | Myers. | |
| 3,213,471 | 10/1965 | Freeman | 15—22 |

EDWARD L. ROBERTS, Primary Examiner

U.S. Cl. X.R.

60—54.5; 91—468